US012801379B2

(12) United States Patent
Cherian et al.

(10) Patent No.: US 12,801,379 B2
(45) Date of Patent: Nov. 17, 2026

(54) DETERMINING OPERATIONS FOR DEVICE PAYLOAD TRANSMISSION USING DYNAMIC MANIFESTS

(71) Applicant: Ordr Inc., Santa Clara, CA (US)

(72) Inventors: Deepak Cherian, Newark, CA (US); Vijayaraghavan Doraiswami, Santa Clara, CA (US); Senthil Arunachalam, Fremont, CA (US)

(73) Assignee: Ordr Inc., Santa Clara, CA (US)

( * ) Notice: Subject to any disclaimer, the term of this patent is extended or adjusted under 35 U.S.C. 154(b) by 234 days.

(21) Appl. No.: 18/636,152

(22) Filed: Apr. 15, 2024

(65) Prior Publication Data

US 2025/0321731 A1 Oct. 16, 2025

(51) Int. Cl.

| | |
|---|---|
| ***G06F 8/34*** | (2018.01) |
| ***G06F 8/658*** | (2018.01) |
| ***G06F 8/71*** | (2018.01) |

(52) U.S. Cl.

CPC ................ *G06F 8/71* (2013.01); *G06F 8/658* (2018.02)

(58) Field of Classification Search

None

See application file for complete search history.

(56) References Cited

U.S. PATENT DOCUMENTS 7,742,406 B1 6/2010 Muppala
9,460,220 B1 * 10/2016 Jenkins ................ G06F 16/955
10,270,886 B1 * 4/2019 Postelnik ................ G06F 8/315
10,554,738 B1 2/2020 Ren
10,742,687 B2 8/2020 Pandian et al.
11,645,180 B1 5/2023 Jain et al.
11,704,351 B1 7/2023 Soleimani et al.
12,405,785 B1 * 9/2025 Pathak ...................... G06F 8/65
2006/0174155 A1 * 8/2006 Mansell .............. G06F 11/3696 714/E11.207
2011/0029921 A1 * 2/2011 Terada .................. G06F 3/0482 715/810
2013/0235795 A1 9/2013 Huang et al.
2014/0286160 A1 9/2014 Zhang et al.
2014/0331042 A1 11/2014 Salo
(Continued)

FOREIGN PATENT DOCUMENTS

CN 111796853 A * 10/2020 ............. G06F 8/654
CN 120110693 A * 6/2025 ......... H04L 63/1433
(Continued)

*Primary Examiner* — Philip Wang
(74) *Attorney, Agent, or Firm* — Invoke

(57) ABSTRACT

Techniques for determining operations for transmitting information from a device on a network are disclosed. Using information identifying a device type and a version of the script executing on the device, the system computes a first dynamic manifest for the device that provides a set of operations for execution in relation to the device. This may include checking the version of the script executing on the device. The system provides an up-to-date version of the script to the device and instructs the device to update the script. The device receives and stores the updated version of the script and initiates a script restart. Upon restarting the script, the device executes the updated version of the script. The system then computes a second dynamic manifest for the device that provides another set of operations for execution in relation to the device.

22 Claims, 5 Drawing Sheets

(56) References Cited

U.S. PATENT DOCUMENTS

| | | | | |
|---|---|---|---|---|
| 2017/0346758 | A1* | 11/2017 | Dimitropoulos | H04L 47/765 |
| 2018/0032900 | A1 | 2/2018 | Chowdhury et al. | |
| 2018/0032901 | A1 | 2/2018 | Chowdhury et al. | |
| 2018/0083833 | A1 | 3/2018 | Zoll et al. | |
| 2018/0144815 | A1 | 5/2018 | Chapman-Mcquiston et al. | |
| 2018/0241644 | A1* | 8/2018 | Lu | H04L 43/0817 |
| 2019/0235850 | A1* | 8/2019 | Mukherjee | G06F 8/71 |
| 2019/0306067 | A1 | 10/2019 | Suraparaju | |
| 2019/0317952 | A1* | 10/2019 | Li | G06F 16/2246 |
| 2020/0264867 | A1* | 8/2020 | Edwards | G06F 9/45512 |
| 2020/0410001 | A1 | 12/2020 | Sarkissian | |
| 2021/0042180 | A1 | 2/2021 | Sutton et al. | |
| 2021/0119870 | A1 | 4/2021 | Hu et al. | |
| 2021/0158171 | A1 | 5/2021 | Rausch et al. | |
| 2021/0218678 | A1 | 7/2021 | Azami et al. | |
| 2023/0042458 | A1 | 2/2023 | Makhija et al. | |
| 2023/0353590 | A1 | 11/2023 | Hubbard | |
| 2024/0053718 | A1* | 2/2024 | Jasper | G05B 19/0428 |
| 2025/0123813 | A1 | 4/2025 | Singh et al. | |
| 2026/0067406 | A1* | 3/2026 | Rozen | H04M 3/568 |

FOREIGN PATENT DOCUMENTS

| | | | | |
|---|---|---|---|---|
| EP | 2411925 | B1 * | 11/2016 | G06F 8/61 |
| WO | 2018/087721 | A1 | 5/2018 | |

* cited by examiner

DETERMINING OPERATIONS FOR DEVICE PAYLOAD TRANSMISSION USING DYNAMIC MANIFESTS

TECHNICAL FIELD

The present disclosure relates to transmitting payloads from devices in a network. In particular, the present disclosure relates to determining operations for transmitting payloads from the devices in a network.

BACKGROUND

The term "Internet of Things" (IoT) refers to a network of a wide variety of devices, such as computers, sensors, vehicles, home appliances, medical equipment, and/or surveillance equipment. Such devices may be referred to as "IoT devices."

Various tools are available to help organizations collect and manage information related to the devices on their network. These tools perform critical function of gathering system attributes, software bill of materials, installed patches, and any custom attributes that the organization may need for maintaining the devices. Scripts operating on the devices periodically transmit payloads from the devices to a server. The scripts executing on the devices in the network may vary from device to device and between devices of the same type. Similarly, content of a payload transmission may differ from device to device and between devices of the same type.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
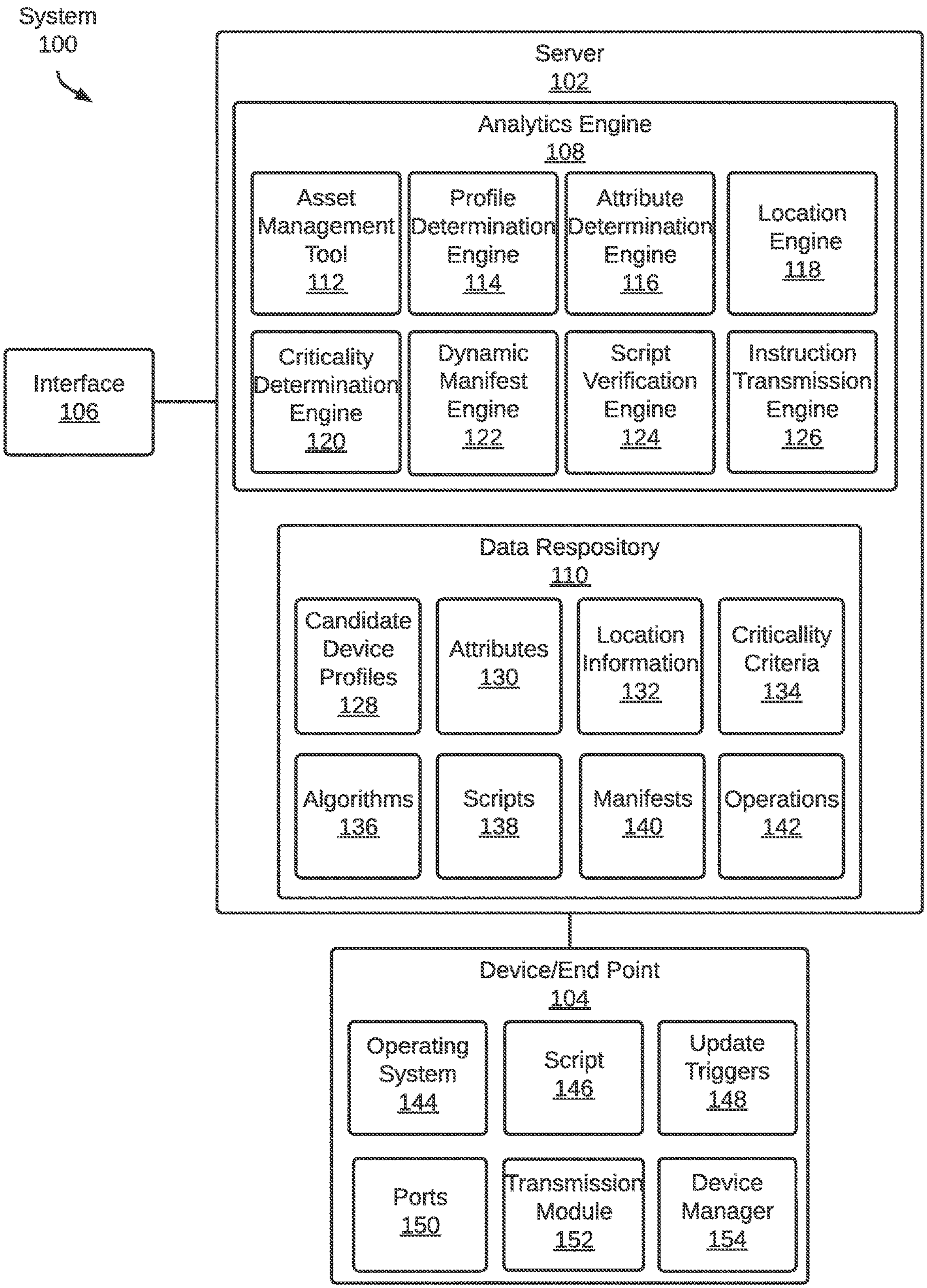
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. ASSET MANAGEMENT SYSTEM ARCHITECTURE
3. DETERMINING OPERATIONS FOR PAYLOAD TRANSMISSION FROM A DEVICE
4. CONTENT OF DEVICE INFORMATION BASED ON CURRENT ATTRIBUTES OF DEVICES
5. PRACTICAL APPLICATIONS, ADVANTAGES & IMPROVEMENTS
6. COMPUTER NETWORKS AND CLOUD NETWORKS
7. MICROSERVICE APPLICATIONS
8. HARDWARE OVERVIEW
9. MISCELLANEOUS; EXTENSIONS

1. GENERAL OVERVIEW

One or more embodiments determine, using a dynamic manifest, operations for transmitting device information from a device. Initially, the system receives from software, e.g., a script, executing on the device, information identifying (a) a type of the device and (b) a version of the script executing on the device. Using the identity information, the system computes a first dynamic manifest for the device that provides a set of operations for execution in relation to the device. The set of operations may include checking if the version of the script executing on the device is up to date. In response to determining that the version of the script executing on the device requires updating, the system provides an up-to-date version of the script to the device and instructs the device to update the script. The device receives and stores the up-to-date version of the script and initiates a restart of the execution of the script.

In one or more embodiments, when the version of the script executing on the device is determined to be up to date, the system computes a second dynamic manifest for the device that provides another set of operations for execution in relation to the device. This set of operations may include obtaining device information from the device, e.g., patches, antivirus information, and applications. Based on the current set of attributes for the device, the system determines content to be included in the device information to be provided by the device. The content of the device information may be a partial or incremental update of information related to the device, i.e., device information that changed since a previous transmission of content from the device.

One or more embodiments use a machine learning model trained to predict content to be included in the device information provided by the device. Training datasets are used to train the machine learning model to predict content of the device information to be included in the transmission. The training datasets include a particular set of device attributes and corresponding identification of content to be provided by the device.

One or more embodiments described in this Specification and/or recited in the claims may not be included in this General Overview section.

2. ASSET MANAGEMENT SYSTEM ARCHITECTURE

FIG. 1 illustrates a system 100 in accordance with one or more embodiments. As illustrated in FIG. 1, the system 100 includes a network comprising a server 102, a device or end system 104 connected to the server 102, and an interface 106 that allows a user to communicate with the server 102. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Components may be distributed over multiple applications and/or machines. Multiple components may be combined into one application and/or machine. Operations described with respect to one component may instead be performed by another component.

In one or more embodiments, the server 102 is hardware and/or software that provides services and resources to the device 104. The server 102 includes an analytics engine 108 and a data repository 110 for managing the device 104 and other devices in the network. This may include collecting information related to the device 104.

In one or more embodiments, the analytics engine 108 refers to hardware and/or software configured to determine operations associated with the device 104 for transmitting device information, e.g., payloads, for the device 104 from the device 104. Examples of operations for transmitting device information from a device are described below with reference to FIGS. 2A and 2B.

In an embodiment, the analytics engine 108 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the analytics engine 108 includes an asset management tool 112, a profile determination engine 114, an attribute determination engine 116, a location engine 118, a criticality determination engine 120, a dynamic manifest engine 122, a script verification engine 124, and an instruction transmission engine 126. These components work together to collect and manage information related to the device 104. More particularly, the analytics engine 108 may receive a request from the device 104 for instruction to transmit a payload. The analytics engine 108 identifies the type of the device making the request, what operations the device is performing, and where the device is located. From this information, the analytics engine 108 determines if the conditions are appropriate for the device to transmit the payload. When the conditions are met for transmitting the payload from the device 104, the analytics engine 108 determines if a script executing on the device 104 is up to date, and if the script is not up to date, provides instructions to the device 104 to update the script along with an up-to-date version of the script. After determining that the script executing on the device is up to date, the analytics engine 108 computes content to be transmitted by the device 104 and provides instructions to the device to transmit the content. Although the components of the analytics engine 108 will be described as separate components, multiple components may be combined into one, and operations described as being performed by one component may alternatively, or additionally, be performed by another component.

In one or more embodiment, the asset management tool 112 of the analytics engine 108, also referred to as an asset tracking or inventory management tool, is software and/or hardware designed to efficiently monitor, track, and manage an organization's physical assets. These assets can range from IT equipment (like computers and servers) to medical devices, vehicles, and machinery. The asset management tool 112 may include various features, such as asset identification, location tracking, status and condition monitoring, depreciation tracking, lifecycle management, alerts and notifications, reporting and analytics, integration capabilities, and/or security and compliance.

In one or more embodiments, the asset management tool 112 allows for the unique identification of the assets through methods, like barcodes, QR codes, RFID tags, or serial numbers, that enable users to track where each asset is located, both in real-time and historically. The asset management tool 112 may be used to record and display the status, condition, and maintenance history of the assets and may assist in managing the financial aspects of assets by tracking their depreciation over time. In some examples, the asset management tool 112 allows for tracking assets from procurement to disposal, including procurement details, maintenance records, and retirement information, and provides alerts for maintenance schedules, warranty expirations, or any other predefined events. The asset management tool 112 may generate reports and provide analytics on asset utilization, maintenance costs, and other relevant metrics.

In one or more embodiments, the asset management tool 112 includes Ordr Software Inventory Collector (OSIC), a software tool used to collect and manage inventory data in an information technology environment, including, for example, a hospital. OSIC is an application used to track a wide range of inventory items, including medical devices and IT equipment. OSIC may be used to automate many of the tasks involved in inventory management, such generating reports and managing orders.

Knowing the type of device is important to determine when a device is available to transmit a payload and what information to include in the device payload. A network may have devices of varying types. A device type may relate to the function of the device, the model of the device, the make of the device, the manufacturer of the device, the operating system being run by the device, updates installed on the device, and other characteristics. Any of these characteristics may affect when it is safe for the device to transmit. Similarly, these characteristics affect the operations associated with the device that are necessary for transmitting payloads from the device.

In one or more embodiments, when the device type of the device operating in the network is not already known, the profile determination engine 114 determines the device type and provides the analytics engine 108 with this information. The profile determination engine 114 refers to software and/or hardware configured to determine a device profile or type from a set of candidate device profiles 128 for the device 104. In one or more embodiments, the profile determination engine 114 utilizes one or more classifiers to determine a device profile for a device. Each classifier takes as input one or more attribute values for attributes 130 associated with a particular device. Different attribute values are input to different classifiers; however, attribute values input to different classifiers may overlap with each other. Based on the inputted attribute values, each classifier outputs a respective candidate device profile from a set of candidate device profiles 128 for the device 104.

In one or more embodiments, a candidate device profile indicates (a) a device photo for a device. (b) expected attribute values associated with a device, and/or (c) a device category. A device photo associated with a candidate device profile may be obtained based on user input. Additionally, or alternatively, a device photo associated with a candidate device profile may be obtained by the system. The expected attribute values of a candidate device profile may be determined via supervised and/or unsupervised machine learning. A candidate device profile may indicate multiple expected values or a range of expected values for an attribute. A candidate device profiles 128 may indicate a single expected value for an attribute. A candidate device profiles 128 may indicate that an expected value for an attribute is null.

As an example, a particular medical device profile may indicate the following:

(a) Flow attributes: bytes communicated in a communication session are within the range 10 KB to 50 KB; frequency of communication sessions is within once every 30 minutes to once every 60 minutes; and duration of communication sessions is within the range of 0.5 seconds to 1.5 seconds;

(b) DNS attributes: query type of a DNS query communicated during a communication session is limited to requests for IPV4 address records (that is, there should be no request IPv6 address records);

(c) DICOM attributes: size of image communicated during a communication session is within the range of 0 MB and 100 MB;

(d) POCT attributes: null (that is, the POCT attribute values should be unavailable); and (e) Traffic statistics: setup time for a Transmission Control Protocol (TCP) session is under a threshold of 1 second; a number of retransmissions of a particular data packet is under a threshold of 5 times.

For a detailed description of operations for determining a device profile, please refer to commonly owned U.S. Pat. No. 10,742,687, the content of which is incorporated herein by reference in its entirety.

In one or more embodiments, the analytics engine 108 utilizes the current attributes of the device 104 to determine when it is safe for the device 104 to transmit and to determine the content of device information to transmit. The attribute determination engine 116 refers to software and/or hardware configured to determine values for a set of attributes 130 of communication sessions conducted by the device 104. A value for an attribute may also be referred to herein as an "attribute value."

In one or more embodiments, types of attributes include, but are not limited to, flow attributes, dynamic host configuration protocol attributes (DHCP), Digital Imaging and Communications in Medicine attributes (DICOM), Point of Care Testing (POCT) attributes, Common Industrial Protocol (CIP) attributes, Session Initiation Protocol (SIP) attributes, Real Time Streaming Protocol (RTSP) attributes, and Building Automation and Control network (BACnet) attributes. The attributes 130 may include the operating system operating on the device 104, e.g., Windows, Linux, Macros, and any updates, add-ons, and patches for the operating systems.

Attributes associated with a flow of a communication session may include any of the following: a source address (such as an IP address and/or a Media Access Control (MAC) address); a destination address; a source port; a destination port; a number of transmitted bytes; a number of received bytes: a source subnet: or a destination subnet.

Attributes associated with a particular protocol (such as IPv4, IPv6, DNS, DICOM, POCT, CIP. SIP, RTSP, DHCP, and BACnet) include values for standard fields specified and/or defined by a corresponding protocol specification. The standard fields may be included in a header, tail, and/or other portion of a data packet.

As an example, standard fields in an IPv4 data packet include any of the following: Internet Protocol Version, Internet Header Length, Differentiated Services Code Point (DSCP), Explicit Congestion Notification (ECN). Total Length, Identification (for example, for identifying the group of fragments of a single IP datagram), Flags, Fragment Offset, Time to Live (TTL), Protocol (for example, for defining the protocol used in the data portion of the IP datagram), Header Checksum, Source Address, Destination Address, and Options. Additional and/or alternative standard fields may be used. A value for a standard field in an IPv4 data packet may be a value for an attribute 130 of a communication session.

As another example, standard fields in a DNS query or response include any of the following: Identification. Flags, Number of Questions, Number of Answers, Number of Authority Resource Records (RRs). Number of Additional RRs, and/or Request Type. Additional and/or alternative standard fields may be used. A value for a standard field in a DNS query or response may be a value for an attribute 130 of a communication session.

As another example, standard fields in a DHCP packet include any of the following: MAC address. IP address, subnet, host name, DHCP Options, DHCP Class Identifier, Manufacturer, DHCP Parameter List, and DHCP Vendor Class. Additional and/or alternative standard fields may be used. A value for a standard field in a DHCP data packet may be a value for an attribute 130 of a communication session.

As another example, DICOM is a protocol for the communication and management of medical imaging information and related data. Standard fields in a DICOM data packet include any of the following: Creation Time, Manufacturer, Institution Name, Referring Physician's Name, Consulting Physician's Name, Operator's Name, Warning Reason, Failure Reason, Patient's Name, Patient Identifier, Patient's Birth Date, Patient's Sex, and/or Image Size. Additional and/or alternative standard fields may be used. A value for a standard field in a DICOM data packet may be a value for an attribute 130 of a communication session.

In one or more embodiments, the analytics engine 108 utilizes the current location of the device 104 to determine when to transmit a payload. The location engine 118 is software and/or hardware used to automatically identify and track the location of devices. The location engine 118 may be a component of a real-time location system (RTLS) or a location determination engine (LDE). The RTLS is a comprehensive system designed to track and manage the real-time location of objects in a specific area, e.g., hospital, while the LDE determines a geographical location of a device in a broader context, e.g., GPS coordinates. Using various technologies and methods, both RTLS and LDE provide accurate and up-to-date location information to the analytics engine 108.

In one or more embodiments, the criticality determination engine 120 of the analytics engine 108 is software and/or hardware used to identify if the operations currently being performed by the device 104 are critical. The criticality determination engine 120 uses the information provided to the analytics engine 108 by the components of the analytics engine 108, i.e., the type of device, the current attributes of the device, and the location of the device to determine if the current operations being performed by the device allow for transmission of a payload, e.g., priority dataset, to the server 102.

For a detailed description of operations for determining when it is safe for the device 104 to transmit, please refer to U.S. patent application Ser. No. 18/581,926, filed Feb. 20, 2024, the content of which is incorporated herein by reference in its entirety.

In one or more embodiments, the dynamic manifest engine 122 of the analytics engine 108 determines operations to be performed in association with the device 104. The dynamic manifest engine 122 is software and/or hardware used to compute instructions for providing to the device 104 based on identity information received from the device. Identity information may include a type of the device, a version of a script executing on the device, and/or current attributes of the device. The dynamic manifest engine 122 may use, for example, lookup tables or charts to identify instructions to be communicated to the device 104. Alternatively, the dynamic manifest engine 122 uses a machine learning model trained using training data that includes attributes of the device of a particular device type and corresponding instructions for the device type.

In embodiments, operations provided by the dynamic manifest engine 122 include operations associated with the device 104. For example, the operations may include checking if a version of a script executing on the device 104 is up to date. In response to determining that the version of the script is not up to date, the operations computed by the dynamic manifest engine 122 include updating the script executing on the device 104. The operations may further include sending device information to the server 102. The device information may be a partial update, i.e., restricted to information that changed since the last payload transmission from the device or device information from a particular category, e.g., patches, applications. Alternatively, the device information may be a full update, i.e., including all device information. The categories of device information may include (a) applications running on the device 104, (b) patches installed on the device 104, (c) inventory attributes of the device 104, and/or (d) anti-virus information for the device 104. The operations computed by the dynamic manifest engine 122 may include sub-operations.

In one or more embodiments, the script verification engine 124 of the analytics engine 108 determines if a version of a script executing on the device 104 is up to date. The script verification engine 124 is software and/or hardware used to compare the script executing on the device 104 with an up-to-date version of the script available in the data repository 110 of the server 102. The script verification engine 124 may determine the version of the script executing on the device 104 using identification information of the script executing on the device 104. Identification information may include a version number of the script or date stamp. The date stamp may indicate when the script was last updated or when the script was created. The script verification engine 124 checks the identification information against a version of the script in the data repository 110 to determine if the script executing on the device 104 is up to date or requires updating. Additionally, or alternatively, operation code in the script executing on the device 104 may be analyzed to identify a version of the script. Differences between operation code of (a) the version of a script executing on the device 104 and (b) a version of the script in the data repository indicate that the versions of the script are different and may require updating.

In one or more embodiments, the script verification engine 124 uses device attributes to determine an up-to-date version of a script. Differences in device attributes between devices of the same type may affect what version of a script is up to date. For example, a first device of a type that is running Windows 7 and that has been updated to include a particular patch may be able to support a newer version of the script than a second device of the same type that is running Windows 7 but that has not been updated. In this example, an up-to-date version of the script for the first device would be different for an up-to-date version of the script for the second device despite the devices being of the same type.

In one or more embodiments, the instruction transmission engine 126 is software and/or hardware used to transmit instructions to the device 104. The instruction transmission engine 126 receives the instructions from the dynamic manifest engine 122 and relays the information to the script executing on the device 104. Instruction transmitted by the instruction transmission engine 126 may include "update version of script", "send partial update", or "send full update."

In one or more embodiments, a data repository 110 is any type of storage unit and/or device (e.g., a file system, database, collection of tables, or any other storage mechanism) for storing data. Further, the data repository 110 may include multiple different storage units and/or devices. The multiple different storage units and/or devices may or may not be of the same type or located at the same physical site. Further, the data repository 110 may be implemented or executed on the same computing system as the analytics engine 108. Additionally, or alternatively, a data repository 110 may be implemented or executed on a computing system separate from the analytics engine 108. The data repository 110 may be communicatively coupled to the analytics engine 108 via a direct connection or via a network.

Information used by the analytics engine 108 to determine operations for transmitting device information from a device may be implemented across any of the components within the system 100. However, this information is illustrated within the data repository 110 for purposes of clarity and explanation. The data repository 110 includes candidate device profiles 128, attributes 130, location information 132, criticality criteria 134, algorithms 136, scripts 138, manifests 140, and operations 142.

In one or more embodiments, the candidate device profiles 128 in the data repository 110 are profiles of various device types that are available on the network or that may become available on a network. The candidate device profiles 128 may be updated as new devices are added to the network, as updates are made to the devices on the network, and/or as changes are made to the network. The candidate device profiles 128 may include identification of a device category. The candidate device profiles 128 may include a device photo for a device. The candidate device profiles 128 may include expected attribute values associated with a device of the type identified.

In one or more embodiments, the attributes 130 in the data repository 110 include candidate attributes, i.e., attributes that may be utilized or expressed by the devices 104 in the network, and current attributes, i.e., attributes that are actively being executed by the devices 104. As noted above, attributes 130 are used by the criticality determination engine 120 to determine when it is safe for a device 104 to transmit information and used by the dynamic manifest engine 122 to determine content of device information for the device 104 to transmit. Attributes 130 may also be received from other, non-network sources, including, for example, data from ServiceNow, Tenable, Jamf, Intune. and other data sources to which the analytics engine 108 is integrated. Attributes 130 may include the following:

(a) Flow attributes: attributes associated with a flow of a communication session, including attributes associated with an Internet Protocol (such as Internet Protocol version 4 (IPv4) and Internet Protocol version 6 (IPv6)) used by a communication session;

(b) DNS attributes: attributes associated with a Domain Name System (DNS) protocol used by a communication session;

(c) DHCP attributes: attributes associated with a Dynamic Host Configuration Protocol (DHCP) used by a communication session;

(d) DICOM attributes: attributes associated with a Digital Imaging and Communications in Medicine (DICOM) protocol used by a communication session;

(e) POCT attributes: attributes associated with a Point of Care Testing (POCT) protocol used by a communication session;

(f) CIP attributes: attributes associated with a Common Industrial Protocol (CIP) used by a communication session;

(g) SIP attributes: attributes associated with a Session Initiation Protocol (SIP) used by a communication session;

(h) RTSP attributes: attributes associated with a Real Time Streaming Protocol (RTSP) used by a communication session; and/or (i) BACnet attributes: attributes associated with a Building Automation and Control network (BACnet) protocol used by a communication session.

In one or more embodiments, the location information 132 in the data repository 110 includes information required by the location engine 118 to determine the location of the device 104 in the network. The location information 132 may include building plans, location of receivers and other sensors within the building, areas designated at critical, e.g., operating room, and areas determined to be non-critical, e.g., hallway. The location information may include maps identifying points of interest, locations of receivers and other sensors within a geographic area, and GPS coordinates. The location information 132 is dependent on the location engine 118 and the information required by the location engine 118 to determine the location of the devices 104.

In one or more embodiments, the criticality criteria 134 in the data repository 110 include reference tables or charts that identify (a) ports 150 used by the devices 104 to transmit critical data, (b) attributes, including transmission protocol and data transmitted, that are determined to be critical, (c) potential locations of the devices 104 that are designated as being critical, and/or (d) combinations of these characteristics deemed to be critical. The criticality criteria 134 may be provided in the form of a training set for a machine learning model. The training set may include a particular attribute and/or a particular location for a device of a particular type and the corresponding criticality level for the particular attribute and/or the particular location for the device of the particular type.

In one or more embodiments, a machine learning algorithm 136 is an algorithm that can be iterated to learn a target model/that best maps a set of input variables to an output variable. In particular, a machine learning algorithm 136 is configured to generate and/or train a machine learning model. The profile determination engine 114 may use a machine learning model to determine a device profile of the device 104. The attribute determination engine 116 may use machine learning models to determine the attributes of the device 104. The location engine 118 may use a machine learning model to determine a location of the device 104. The criticality determination engine 120 may use a machine learning model to determine if the current attributes of the device 104 meet criticality criteria; the dynamic manifest engine 122 may use a machine learning model to determine operations for transmitting payload for a device; and the script verification engine 124 may use a machine learning model to determine an up-to-date script for the device 104.

A machine learning algorithm is an algorithm that can be iterated to learn a target model f that best maps a set of input variables to an output variable using a set of training data. The training data includes datasets and associated labels. The datasets are associated with input variables for the target model f. The associated labels are associated with the output variable of the target model f. For example, a training dataset used to train the machine learning model used by the criticality determination engine 120 to predict criticality levels may include a particular set of current attributes and a corresponding criticality level. A training dataset used to train the machine learning model used by the dynamic manifest engine 122 to predict the instructions for the device 104 may include a particular set of current attributes and a corresponding instruction. The training data may be updated based on, for example, feedback on the accuracy of the current target model f. Updated training data is fed back into the machine learning algorithm that in turn updates the target model f.

A machine learning algorithm 136 generates a target model f, so the target model f best fits the datasets of training data to the labels of the training data. Additionally, or alternatively, a machine learning algorithm 136 generates a target model f, so when the target model f is applied to the datasets of the training data, a maximum number of results determined by the target model/matches the labels of the training data. Different target models can be generated based on different machine learning algorithms and/or different sets of training data.

A machine learning algorithm 136 may include supervised and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, the scripts 138 include up-to-date versions of scripts for the device 104 and other devices in the network. An up-to-date version of a script for a particular device type may not be the newest version of the script for that particular device type. A device of a particular type may not include the most recent version of an operating system or the most up-to-date patches or add-ons; therefore, the device may be unable to support operations defined in the newest version of the script for that device type. In this manner, an older version of the script may be the most up-to-date version of the script capable of being executed by the device.

In one or more embodiments, the manifests 140 are generated by the dynamic manifest engine 122 and include the operations 142 to be performed in relation to or in association with the device 104. The operations 142 may include sub-operations. Example operations include updating a version of the script, sending partial device information, and sending complete device information. The operations 142 may differ between devices of different types and between devices of the same type but having different attributes.

In one or more embodiments, the device 104 of the system 100 performs various operations. The device 104 may be industrial equipment in a manufacturing setting or within a geographical area or medical equipment in a hospital or clinical environment. The device 104 may be of the same type as or of a different type from other devices in the network. The device 104 may be used for the same purpose or different purposes as other devices in the network. The device may operate in the same mode or different mode from other devices in the network. Peripherals (e.g., modems, routers, storage devices) may be connected to the device 104. The device 104 may include an operating system 144, a script 146, update triggers 148, ports 150, a transmission module 152, and a device manager 154.

In one or more embodiments, the operating system 144 of the device 104 is software that serves as an intermediary between computer hardware and the user's applications. The operating system 144 provides a platform for software applications to run on the device 104 by managing resources like memory, processing power, and input/output operations. The operating system 144 used by the device 104 depends on the specific requirements of the device 104 and the environment where the device 104 operates. Examples of operating systems include Real-Time Operating System (RTOS), Linux, Windows, VxWorks, QNX, MacOS, iOS, and Android Things.

In one or more embodiments, the device 104 includes a script 146, or other software, executing on the device for facilitating communication with the analytics engine 108. More particularly, the script 146 includes a set of instructions or commands that work in combination with the analytics engine 108 to automate transmission of a payload, e.g., priority dataset, from the device 104 to the server 102.

In one or more embodiments, the script 146 executing on the device 104 checks with the criticality determination engine 120 of the analytics engine 108 to determine whether or not to transmit a payload to the server 102. In addition, the script 146 consults the dynamic manifest engine 122 of the analytics engine 108 for operations associated with the device 104 for transmitting the payload. The script 146 executing on the device 104 may be out of date and require updating.

In one or more embodiments, an OSIC script is installed on the device 104 to enable communication between the device 104 and the analytics engine 108, including an OSIC asset management tool. The OSIC script is lightweight and achieves its purpose using the components already installed in the operating system 144 of the device 104. This may be important, for there may be restrictions, e.g., FDA restriction on medical devices, on the installation of any new software components on the device 104.

In one or more embodiments, the device 104 includes update triggers 148 that trigger the device 104 to perform operations or actions. The update triggers 148 may include recognizing that a file has been added to a directory. More particularly, the update triggers 148 may include recognizing that a file, e.g., a newer or up-to-date version of a script, has been added to a directory on the device 104. Upon recognizing the addition of a new file, e.g., an up-to-date version of the script for the device 104, the update trigger initiates a restarting of the script executing on the device. When the script restarts, the up-to-date version of the script is executed in place of the previously executed version of the script.

In one or more embodiments, the device 104 includes one or more ports 150 that may be physical and/or digital ports. Physical ports are tangible, hardware-based interfaces on the device that allow for the connection of external devices or components. These ports are typically located on the outer surface of a device and are used to physically plug in cables, connectors, or other hardware. The physical ports facilitate the exchange of data, power, or other signals between the device and external peripherals. Examples of physical ports include USB ports (Universal Serial Bus), HDMI ports (High-Definition Multimedia Interface), Ethernet ports (for wired network connections), audio jacks (for headphones, microphones, speakers), and power ports (for electrical power input). Digital ports refer to software-based interfaces or entry points in an operating system or software environment of the device 104. Digital ports offer virtual access points that allow software components to communicate with each other or with external devices. Examples of digital ports include TCP/IP ports and GPIO (General Purpose Input/Output) pins. TCP/IP ports are specific numbers assigned to applications or services to facilitate communication over a network. TCP/IP ports are used in protocols like Transmission Control Protocol (TCP) and User Datagram Protocol (UDP). GPIO pins serve as digital ports that can be configured to input or output signals to control or receive data from external hardware.

In one or more embodiments, activity on one or more of the ports 150 indicate the presence of peripherals in communication with the device 104. The peripherals may include an external modem, an external storage, a dongle, or other wired or wireless equipment associated with the device.

In one or more embodiments, the device 104 includes a transmission module 152 for communicating with the analytics engine 108 of the server 102. More particularly, the transmission module 152 may be configured to receive instructions, including operations to be performed by the device, from the analytics engine 108. In addition, the transmission module 152 transmits payloads from the device 104 to the server 102. The transmission module 152 is configurable as to when to transmit a payload. The payload from the device 104 may be scheduled to be transferred daily, every other day, one or more times a week, after any updates, upon any significant activity by the device, and/or based on any other criteria. The time of day of the payload transmission may also be configurable. In some instances, transmission of a payload is configured to occur after midnight.

In one or more embodiments, the device manager 154 is hardware and/or software that manages hardware components associated with the device. The device manager 154 may be a component of the operating system 144. The device manager 154 may facilitate interaction between the operating system 144 and the hardware components associated with the device, ensuring that the hardware components are recognized, configured, and controlled properly. The device manager 154 may detect hardware components when connected to the device 104, e.g., USB devices, graphics cards, network adapters, printers, etc. The device manager 154 may install necessary device drivers required for the proper functioning of hardware components. The device manager 154 may allow for configuration and customization of hardware settings, such as, screen resolution for displays, network settings for network adapters, etc. The device manager 154 may provide information about the status and health of hardware components, e.g., working correctly, encountering errors, or requiring maintenance.

In one or more embodiments, interface 106 refers to hardware and/or software configured to facilitate communications between a user and the analytics engine 108. Interface 106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 106 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, interface 106 is specified in one or more other languages, such as Java, C, or C++.

Additional embodiments and/or examples relating to computer networks are described below in Section 6, titled "Computer Networks and Cloud Networks."

3. DETERMINING OPERATIONS FOR PAYLOAD TRANSMISSION FROM A DEVICE

Figure 2A:
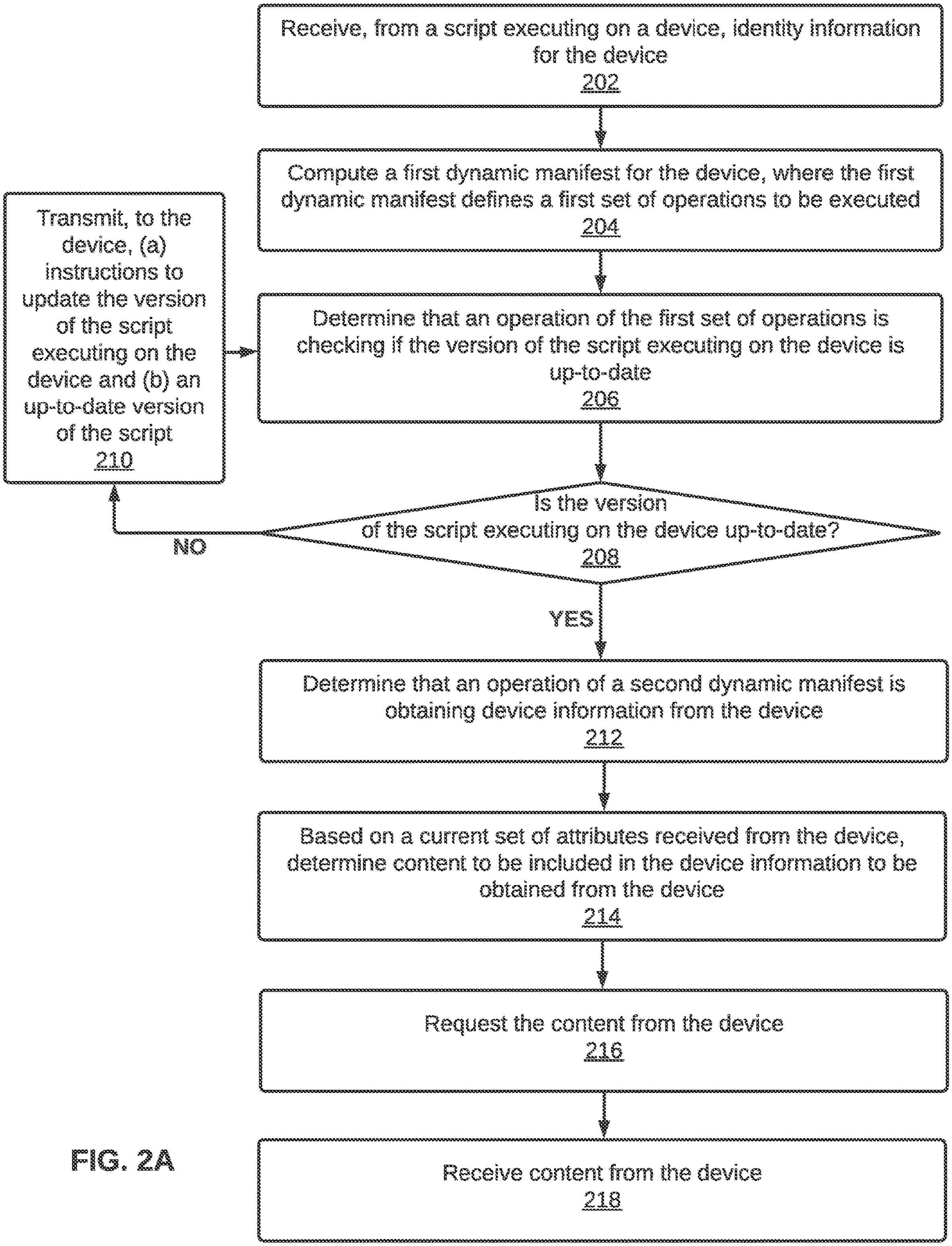
FIGS. 2A and 2B illustrate an example set of operations for determining operations for transmitting payloads from devices in a network in accordance with one or more embodiments.

FIG. 2A illustrates an example set of operations that determine operations for transmitting payload from a device in accordance with one or more embodiments. These operations may be viewed as being from the perspective of a server communicating with a device in a network. One or more operations illustrated in FIG. 2A may be modified, rearranged, or omitted. Accordingly, the particular sequence of operations illustrated in FIG. 2A should not be construed as limiting the scope of one or more embodiments.

One or more embodiments receive, from a script executing on a device, identity information for the device (Operation 202). A network may comprise one or more devices of the same type and/or of different types. The device on the network may be industrial equipment, medical equipment, or commercial equipment. Periodically, a device on the network may reach out to an analytics engine on a server to retrieve instructions for transmitting a payload, i.e., device information, from the device to the server. More particularly, a script on the device communicates with the analytics engine to determine (a) when to transmit and (b) operations for transmitting the payload. The analytics engine receives the identity information from the script executing on the device. The identity information transmitted by the device may include a type of the device and a version of the script executing on the device. Alternatively, one or more components of the analytics engine analyze attributes of the device to determine the identity information. For example, the device type of a device may be determined by a profile determination engine of the analytics engine. The version of the script executing on the device may be provided directly by the script or determined using a trained machine learning model.

One or more embodiments compute a first dynamic manifest for the device, where the first dynamic manifest defines a first set of operations to be executed (Operation 204). Using the device information provided to the analytics engine by the script executing on the device, a dynamic manifest engine of the analytics engine computes a first dynamic manifest for the device. In computing the first dynamic manifest, the dynamic manifest engine determines the first set of operations to be executed in association with the device for transmitting a payload from the device. The first set of operations may include operations executable by (a) the device, (b) components of the analytics engine, or (c) both the device and components of the analytics engine.

One or more embodiments determine that an operation of the first set of operations is checking if the version of the script executing on the device is up to date (Operation 206). The operations for transmitting a payload from the device to the analytics engine is performed by the script executing on the device. An out-of-date script executing on the device may negatively impact the transmission payload and the content of the payload. For example, a script that is not up to date may not recognize operation code provided by the dynamic manifest engine, and therefore, would be unable to perform the operation. Using identity information, either received from the script of the device or determined by components of the analytics engine, the dynamic manifest engine of the analytics engine determines that an operation of the first set of operations is checking if the version of the script executing on the device is up to date.

One or more embodiments determine if the version of the script executing on the device is up to date (Operation 208). After determining that the version of the script executing on the device should be checked, a script determination engine of the analytics engine determines if the script executing on the device is up to date. The script determination engine compares information about the version of the script executing on the device to one or more scripts available to the analytics engine to determine if the version of the script executing on the device is up to date. The script determination engine may use a date stamp or version number of the script executing on the device to determine if the script executing on the device is up to date. Alternatively, the script determination engine determines that the version of the script is up to date by comparing a list of operation code in the version of the script executing on the device to operation code in versions of the script available to the analytics engine. Additional operation code on a version of the script available to the analytics engine may indicate that the script executing on the device requires updating.

One or more embodiments transmit, to the device, (a) instructions to update the version of the script executing on the device and (b) a target version of the script (Operation 210). When the script verification engine of the analytics engine determines that the script executing on the device is out of date, i.e., requires updating, an instruction transmission engine of the analytics engine sends instructions to the device to update the script. Along with the instructions to update the script, the instruction transmission engine provides an up-to-date version, i.e., target version, of the script to the device. The device receives the target version of the script from the analytics engine, saves the target version of the script locally on the device, and initiates a restart of the script executing on the device. When the script restarts, the up-to-date version of the script is loaded and becomes the script executing on the device. The restart of the script may be initiated by an update trigger of the device that is activated when the up-to-date version of the script is saved to, for example, a local directory on the device.

Subsequent to updating the version of the script executing on the device to the up-to-date version of the script, the device may once again communicate with the dynamic manifest engine for the first set of operations. The first set of operations may once again include checking if the script executing on the device requires updating.

One or more embodiments determine that an operation of a second dynamic manifest is obtaining device information from the device (Operation 212). After determining that the version of the script executing on the device is up to date, and therefore does not require updating, the dynamic manifest engine computes a second dynamic manifest. The second dynamic manifest includes a second set of operations associated with the device for transmitting a payload from the device. The second set of operations may include instructions to the device to provide information to the analytics engine.

One or more embodiments determine, based on a current set of attributes received from the device, content to be included in the device information to be obtained from the device (Operation 214). When determining the second set of operations associated with the device, the dynamic manifest analyzes a current set of attributes of the device. The current set of attributes may be provided by an attribute determination engine of the analytics engine. Based on the analysis of the current set of attributes of the device, the dynamic manifest engine determines content of the device information to be provided by the device. The current set of attributes may include a version of an operating system operating on the device, ports currently being accessed by the device, and/or users connected to the device.

One or more embodiments request the content from the device (Operation 216). A criticality determination engine of the analytics engine may first determine that the device is not performing any critical operations. Then, after the dynamic manifest engine determines the content to be transmitted by the device, the instruction transmission engine of the analytics engine communicates with the device the content of information to be transmitted by the device. The instructions may include operations for providing a partial or incremental update of device information or a complete update of device information. A partial update may be limited to including the device information that changed from the last transmission or information for a particular category of device information. Multiple request for content from the device may be computed by the dynamic manifest and sent to the device.

One or more embodiments receive content from the device (Operation 218). After receiving the request for content from the instruction transmission engine of the analytics engine, the device collects the requested device information. The device information may be provided by a device manager or other components of the device. The device then provides the information to the analytics engine that receives the content from the device.

Figure 2B:
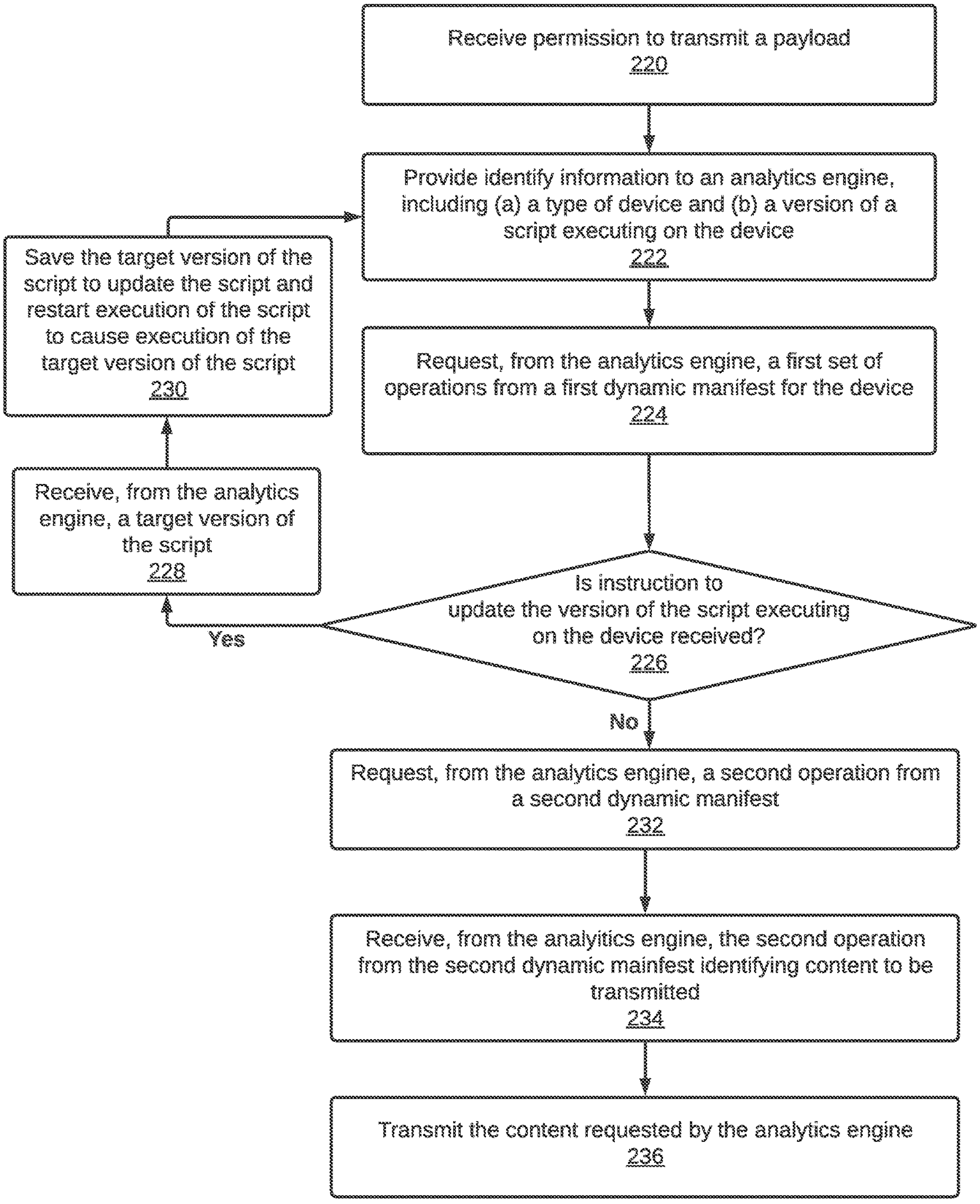

FIG. 2B illustrates another example set of operations that determine operations for transmitting payload from a device in accordance with one or more embodiments. These operations may be viewed as being from the perspective of a device in a network communicating with a server. One or more operations illustrated in FIG. 2B may be modified, rearranged, or omitted. Accordingly, the particular sequence of operations illustrated in FIG. 2B should not be construed as limiting the scope of one or more embodiments.

One or more embodiments receive permission to transmit a payload (Operation 220). Permission to transmit a payload may be received from an analytics engine that uses attributes of the device to determine a device type and when conditions are appropriate for transmitting a payload, i.e., no critical operations are being performed by the device. When a criticality determination engine of the analytics engine determines that it is safe for the device to transmit a payload, the device receives from the analytics engine instructions to initiate operations for transmitting a payload.

One or more embodiments provide identity information to the analytics engine, including (a) a type of device and (b) a version of a script executing on the device (Operation 222). Upon receiving confirmation from the analytics engine that the device is not performing any critical functions, the device provides identity information to the analytics engine, so the analytics engine may determine operations for the device to perform to complete a payload transmission. Identity information provided by the device may include the type of device and a version of the script executing on the device.

One or more embodiments request, from the analytics engine, a first set of operations from a first dynamic manifest for the device (Operation 224). When providing the identity information to the analytics engine, the device also requests from a dynamic manifest engine of the analytics engine a first set of operations to be performed for transmitting a payload from the device. The first set of operations computed for the first dynamic manifest for the device may include updating the script executing on the device.

One or more embodiments receive instruction to update the version of the script executing on the device (Operation 226). When the device receives instruction to update the version of the script executing on the device, the device also receives, from the analytics engine, a target version of the script (Operation 228). The target version of the script is an up-to-date version of the script.

One or more embodiments save the target version of the script to update the script and restart execution of the script to cause execution of the target version of the script (Operation 230). Upon receiving the target version of the script, the device saves the target version of the script locally on the device. Saving the target version of the script updates the script on the device to the target version of the script. The script initiates a restart of the script, causing execution of the target version of the script.

One or more embodiments request, from the analytics engine, a second operation from a second dynamic manifest (Operation 232). In response to receiving indication that the version of the script executing on the device is up to date, the device requests from the dynamic manifest engine of the analytics engine a second operation to perform for transmitting a payload to the analytics engine.

One or more embodiments receive, from the analytics engine, the operation from the second dynamic manifest identifying content to be transmitted (Operation 234). In response to the request to the dynamic manifest engine of the analytics engine for a second operation to perform for transmitting a payload, the device receives from the analytics engine a second operation. The second operation may include instructions for the device to transmit device information of a particular category. Alternatively, the instructions for the device may include instructions to transmit device information from multiple categories. The instructions may also restrict transmissions to partial or incremental updates from one or more categories.

One or more embodiments transmit the content requested by the analytics engine (Operation 236). Upon receipt of the instructions from the analytics engine, the device transmits the payload to the server. The payload, i.e., the device information, requested by the analytics engine may be compiled by a device manager of the device and may be transmitted by a transmission module of the device.

One or more additional requests to the dynamic manifest engine of the analytics engine for operations may be made by the device until the necessary device information is transmitted to the analytics engine by the device.

4. CONTENT OF DEVICE INFORMATION BASED ON CURRENT ATTRIBUTES OF DEVICES

A detailed example is described below for purposes of clarity. Components and/or operations described below should be understood as one specific example that may not be applicable to certain embodiments. Accordingly, components and/or operations described below should not be construed as limiting the scope of any of the claims.

Figure 3:
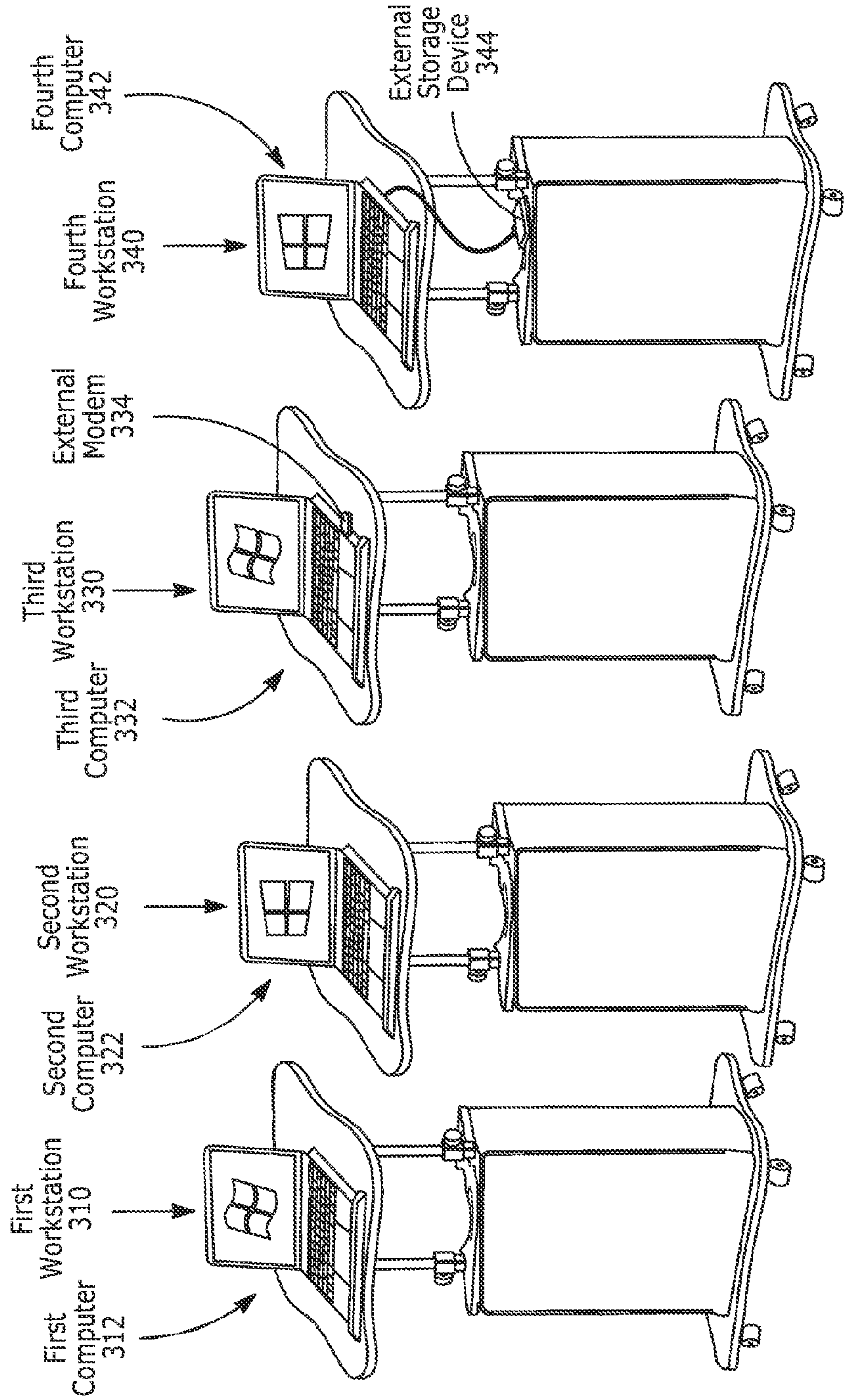
FIG. 3 illustrates multiple workstations of the same device type and different device attributes.

FIG. 3 illustrates multiple workstations of similar types and differing attributes. Although the workstations are of similar types, operations for transmitting payload from the workstations may differ between the workstations. The difference in operation may include determining if a script executing on a particular workstation requires updating or not. The differences in operation may also include determining different content of device information for transmission by each of the workstations.

With continued reference to FIG. 3, a first workstation 310 includes a first computer 312 executing Windows 7, a second workstation 320 includes a second computer 322 executing Windows 10, a third workstation 330 includes a third computer 332 executing Windows 7, and a fourth workstation 340 includes a fourth computer 342 executing Windows 10. The third workstation 330 further includes an external modem 334 connected to the third computer 332, and the fourth workstation 340 further includes an external storage device 344 connected to the fourth computer 342.

Although the first and third computers 312 and 332 of the respective first and third workstations, 310 and 330, respectively, are executing Windows 7, there may be differences in add-ons, updates, and/or patches installed on the first and third computers, 312 and 332, respectively. Similarly, although the second and fourth computers, 322 and 342, respectively, are executing Windows 10, there may be differences in add-ons, updates, and/or patches installed on the second and fourth computers, 322 and 342, respectively. In addition to the differences between operating systems, the third and fourth workstations, 330 and 340, respectively, include additional components connected to the third and fourth computers, 332 and 342, respectively.

The differences between the attributes of the workstations result in different versions of scripts being the up-to-date versions of the script for executing payload transmission from the respective workstations. For example, if the most recent updates for Windows 10 are installed on the second computer 322 and the updates are not installed on the fourth computer 342, the fourth computer 342 may not be able to execute operation code included in the most recent version of a script available for the device of the type of the workstation executing an up-to-date Windows 10. In this manner, an up-to-date version of the script for the second computer 324 would be different from an up-to-date version of the script for the fourth computer 344.

The differences between the workstations may also result in differences in content of the payload transmitted from each of the workstations even for devices having similar attributes. For example, even though the first and third computers, 312 and 332, respectively, may be executing Windows 7, with identical add-ons, updates, and patches installed on the first and third computers, 312 and 332, respectively, the external modem 334 connected to the third computer 332 would result in a change to the content of the payload requested from the third workstation 330 as compared to the content of the payload requested from the first workstation 310. The additional content requested of the third workstation 330 may include security and/or access information for the device resulting from the external model 334 being connected to the third computer 332.

5. PRACTICAL APPLICATIONS, ADVANTAGES & IMPROVEMENTS

The ability to compute operations for a device using a dynamic manifest allows for real-time updates to information, e.g., inventory, resources, or dependencies. This ensures access to the most current information. Using a dynamic manifest also reduces the risk of errors or outdated data. Adapting to changes is made easier with a dynamic manifest. For example, if dependencies change or new features are added to the device, a dynamic manifest can automatically reflect these updates without manual intervention.

The use of dynamic manifests streamlines processes by automating tasks, e.g., resource allocation, distribution, and/or configuration management. Improving efficiencies may lead to cost savings and improved productivity. Dynamic manifests enable scaling of resources to accommodate growing needs or fluctuating demands, e.g., managing an increasing number of devices, users, or software components. Dynamic manifests permit customization of information or resources according to preferences and/or specific requirements.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally, or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
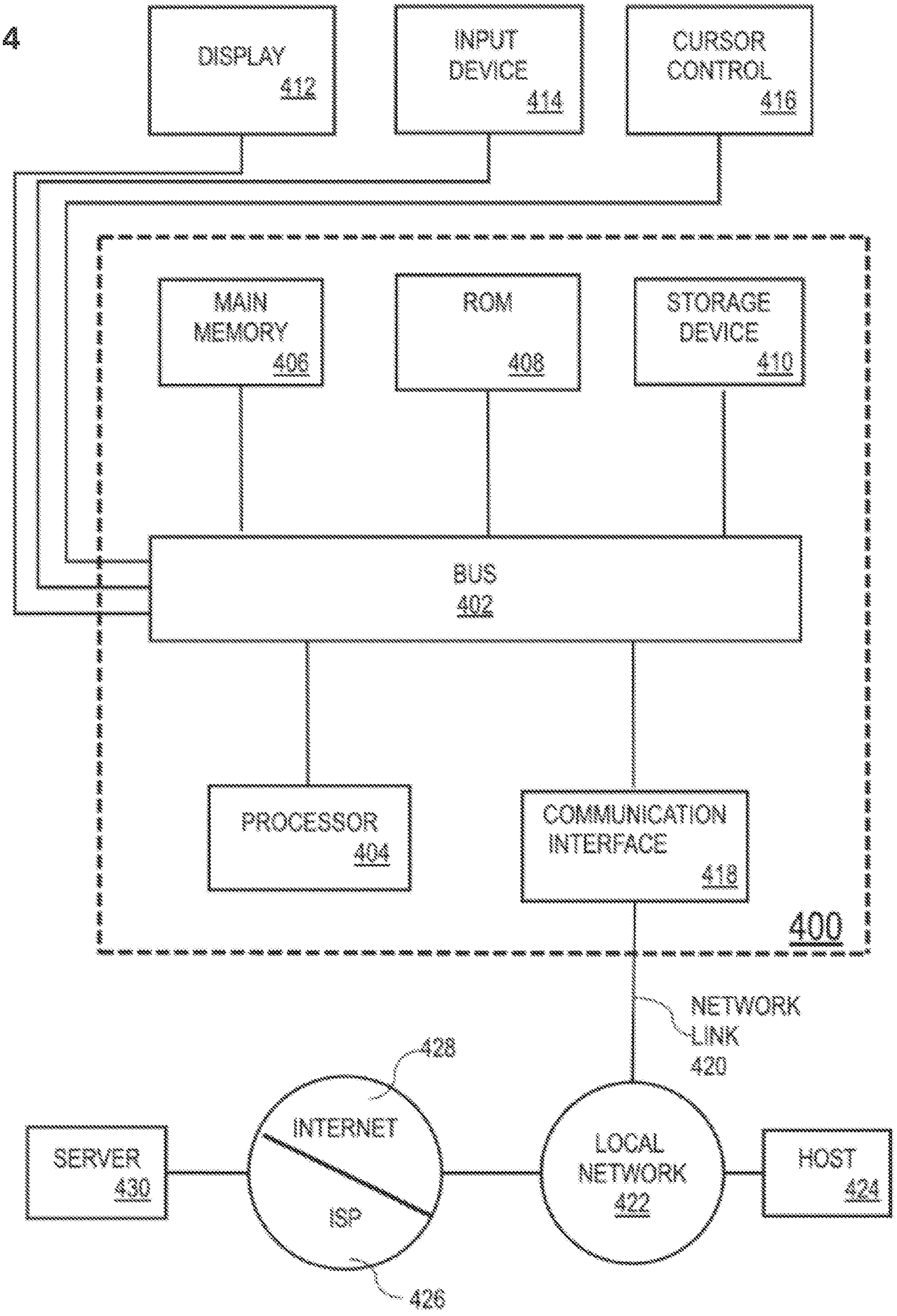
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

9. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions that, when executed by one or more hardware processors, causes performance of steps comprising:

receiving, from a first version of a script executing on a device, a first set of identity information corresponding to the device, the first set of identity information identifying:

(a) a type of the device, and (b) the first version of the script executing on the device; and based on the first set of identity information for the device:

computing a first dynamic manifest for the device, wherein the first dynamic manifest defines a first set of operations to be executed in relation to the device, wherein computing the first dynamic manifest comprises determining, based at least in part on the first set of identity information, the first set of operations to be included in the first dynamic manifest;

determining that a first operation of the first set of operations defined by the first dynamic manifest comprises checking if the first version of the script executing on the device is up to date;

executing the first operation to determine if the first version of the script executing on the device is up to date; and responsive to determining that the first version of the script executing on the device is not up to date: transmitting instructions, to the device, to update the first version of the script to a target version of the script.

2. The one or more non-transitory computer readable media of claim 1, wherein the steps further comprise:

responsive to determining that the first version of the script executing on the device is not the target version of the script for the device, transmitting the target version of the script to the device.

3. The one or more non-transitory computer readable media of claim 2, wherein the first version of the script receives and stores the target version of the script and initiates a script restart that causes execution of the target version of the script after the script restart instead of the first version of the script of the script.

4. The one or more non-transitory computer readable media of claim 1, wherein the steps further comprise:

receiving, from the target version of the script executing on the device, a second set of identity information corresponding to the device, the second set of identity information identifying:

(a) the type of the device, and (b) the target version of the script executing on the device; and based on the second set of identity information for the device:

computing a second dynamic manifest for the device, wherein the second dynamic manifest defines a second set of operations to be executed in relation to the device;

determining that a second operation of the second set of operations defined by the second dynamic manifest comprises checking if the target version of the script executing on the device is up to date;

executing the second operation to determine if the target version of the script executing on the device is up to date;

responsive to determining that the target version of the script executing on the device is up to date:

determining that a third operation of the second set of operations defined by the second dynamic manifest comprises obtaining device information from the device;

accessing a current set of attributes that are (a) associated with the device and (b) received with the second set of identity information;

based on the current set of attributes, determining content to be included in the device information to be obtained from the device; and requesting the content from the device.

5. The one or more non-transitory computer readable media of claim 4, wherein the content to be included in the device information to be obtained from the device includes a partial update.

6. The one or more non-transitory computer readable media of claim 1, wherein the first set of identify information further comprises a set of current attributes of the device, wherein the steps further comprise:

determining that the device is not currently executing any operation that meets a one or more criticality criteria; and responsive to determining that the device is not currently executing any operation that meets the one or more criticality criteria, causing the device to transmit content from the device.

7. The one or more non-transitory computer readable media of claim 1, wherein the target version of the script executing on the device includes one or more operation codes not included in the first version of the script.

8. The one or more non-transitory computer readable media of claim 1, wherein the first set of operations are specific to the type of the device and the first version of the script.

9. A method comprising:

receiving, from a first version of a script executing on a device, a first set of identity information corresponding to the device, the first set of identity information identifying:

(a) a type of the device, and (b) the first version of the script executing on the device; and based on the first set of identity information for the device:

computing a first dynamic manifest for the device, wherein the first dynamic manifest defines a first set of operations to be executed in relation to the device, wherein computing the first dynamic manifest comprises determining, based at least in part on the first set of identity information, the first set of operations to be included in the first dynamic manifest;

determining that a first operation of the first set of operations defined by the first dynamic manifest comprises checking if the first version of the script executing on the device is up to date;

executing the first operation to determine if the first version of the script executing on the device is up to date; and responsive to determining that the first version of the script executing on the device is not up to date: transmitting instructions, to the device, to update the first version of the script to a target version of the script, wherein the method is performed by at least one device including a hardware processor.

10. The method of claim 9, further comprising:

responsive to determining that the first version of the script executing on the device is not the target version of the script for the device, transmitting the target version of the script to the device.

11. The method of claim 10, wherein the first version of the script receives and stores the target version of the script and initiates a script restart that causes execution of the target version of the script after the script restart instead of the first version of the script of the script.

12. The method of claim 9, further comprising:

receiving, from the target version of the script executing on the device, a second set of identity information corresponding to the device, the second set of identity information identifying:

(a) the type of the device, and (b) the target version of the script executing on the device; and based on the second set of identity information for the device:

computing a second dynamic manifest for the device, wherein the second dynamic manifest defines a second set of operations to be executed in relation to the device;

determining that a second operation of the second set of operations defined by the second dynamic manifest comprises checking if the target version of the script executing on the device is up to date;

executing the second operation to determine if the target version of the script executing on the device is up to date;

responsive to determining that the target version of the script executing on the device is up to date:

determining that a third operation of the second set of operations defined by the second dynamic manifest comprises obtaining device information from the device;

accessing a current set of attributes that are (a) associated with the device and (b) received with the second set of identity information;

based on the current set of attributes, determining content to be included in the device information to be obtained from the device; and requesting the content from the device.

13. The method of claim 12, wherein the content to be included in the device information to be obtained from the device includes a partial update.

14. The method of claim 9, wherein the first set of identity information further comprises a set of current attributes of the device, further comprising:

based on the first set of identity information, determining that the device is not currently executing any operation that meets a one or more criticality criteria; and responsive to determining that the device is not currently executing any operation that meets the one or more criticality criteria, causing the device to transmit content from the device.

15. The method of claim 9, wherein the target version of the script executing on the device includes one or more operation codes not included in the first version of the script.

16. A system comprising:

at least one device including a hardware processor;

the system being configured to perform steps comprising:

receiving, from a first version of a script executing on a device, a first set of identity information corresponding to the device, the first set of identity information identifying:

(a) a type of the device, and (b) the first version of the script executing on the device; and based on the first set of identity information for the device:

computing a first dynamic manifest for the device, wherein the first dynamic manifest defines a first set of operations to be executed in relation to the device, wherein computing the first dynamic manifest comprises determining, based at least in part on the first set of identity information, the first set of operations to be included in the first dynamic manifest;

determining that a first operation of the first set of operations defined by the first dynamic manifest comprises checking if the first version of the script executing on the device is up to date;

executing the first operation to determine if the first version of the script executing on the device is up to date; and responsive to determining that the first version of the script executing on the device is not up to date: transmitting instructions, to the device, to update the first version of the script to a target version of the script.

17. The system of claim 16, wherein the steps further comprise:

responsive to determining that the first version of the script executing on the device is not the target version of the script for the device, transmitting the target version of the script to the device.

18. The system of claim 17, wherein the first version of the script receives and stores the target version of the script and initiates a script restart that causes execution of the target version of the script after the script restart instead of the first version of the script of the script.

19. The system of claim 16, wherein the steps further comprise:

receiving, from the target version of the script executing on the device, a second set of identity information corresponding to the device, the second set of identity information identifying:

(a) the type of the device, and (b) the target version of the script executing on the device; and based on the second set of identity information for the device:

computing a second dynamic manifest for the device, wherein the second dynamic manifest defines a second set of operations to be executed in relation to the device;

determining that a second operation of the second set of operations defined by the second dynamic manifest comprises checking if the target version of the script executing on the device is up to date;

executing the second operation to determine if the target version of the script executing on the device is up to date;

responsive to determining that the target version of the script executing on the device is up to date:

determining that a third operation of the second set of operations defined by the second dynamic manifest comprises obtaining device information from the device;

accessing a current set of attributes that are (a) associated with the device and (b) received with the second set of identity information;

based on the current set of attributes, determining content to be included in the device information to be obtained from the device; and requesting the content from the device.

20. The system of claim 19, wherein the content to be included in the device information to be obtained from the device includes a partial update.

21. The system of claim 16, wherein the first set of identity information further comprises a set of current attributes of the device, wherein the steps further comprise:

based on the first set of identity information, determining that the device is not currently executing any operation that meets a one or more criticality criteria; and responsive to determining that the device is not currently executing any operation that meets the one or more criticality criteria, causing the device to transmit content from the device.

22. The system of claim 16, wherein the target version of the script includes one or more operation codes not included in the first version of the script.

* * * * *